(No Model.) 6 Sheets—Sheet 1.

C. H. TRASK.
HEEL TRIMMING MACHINE.

No. 521,770. Patented June 19, 1894.

WITNESSES.
J. M. Dolan
A. P. Porter.

INVENTOR.
Charles H. Trask
by his attys
Clarke & Raymond

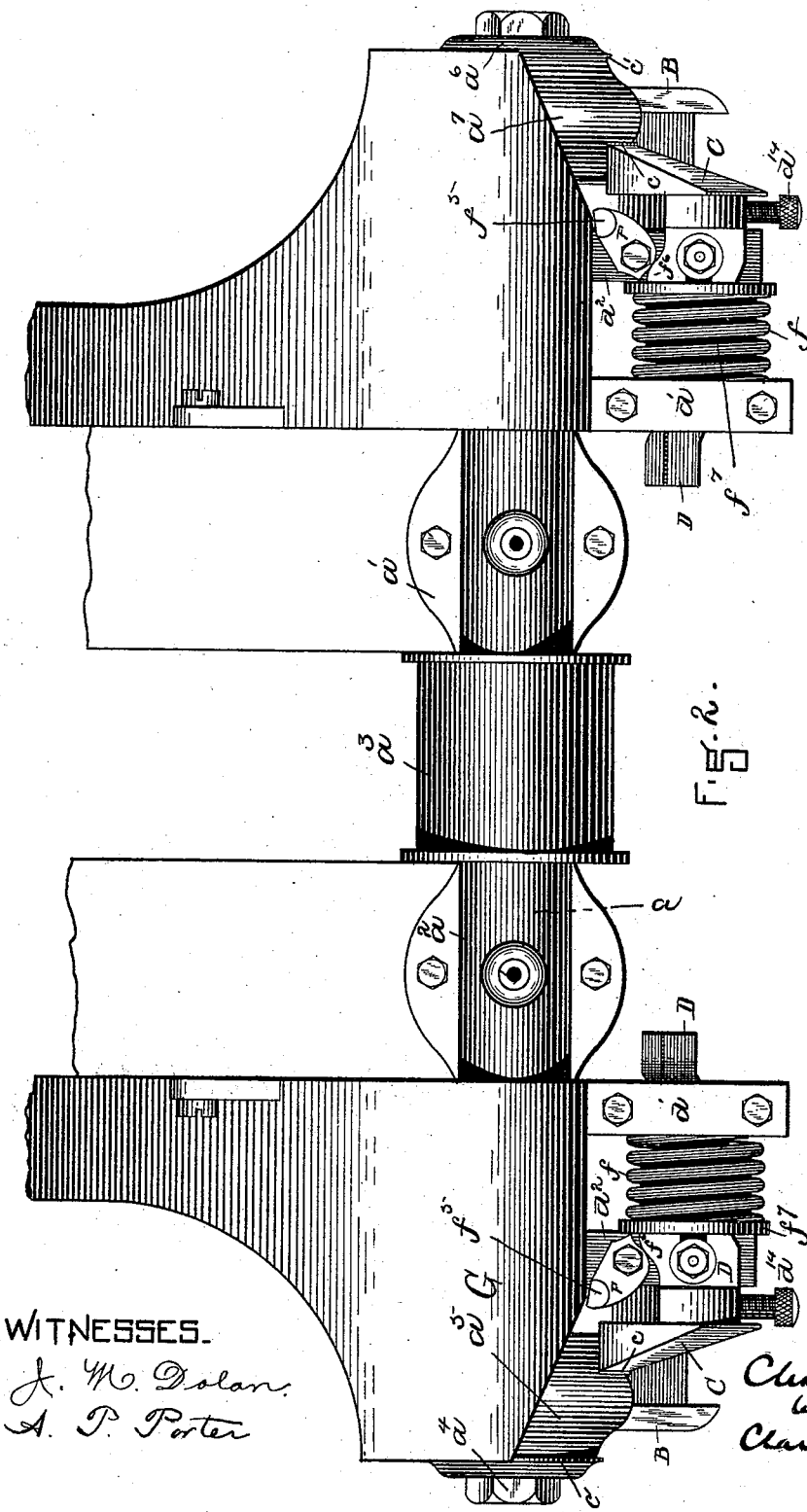

(No Model.) 6 Sheets—Sheet 3.
C. H. TRASK.
HEEL TRIMMING MACHINE.
No. 521,770. Patented June 19, 1894.
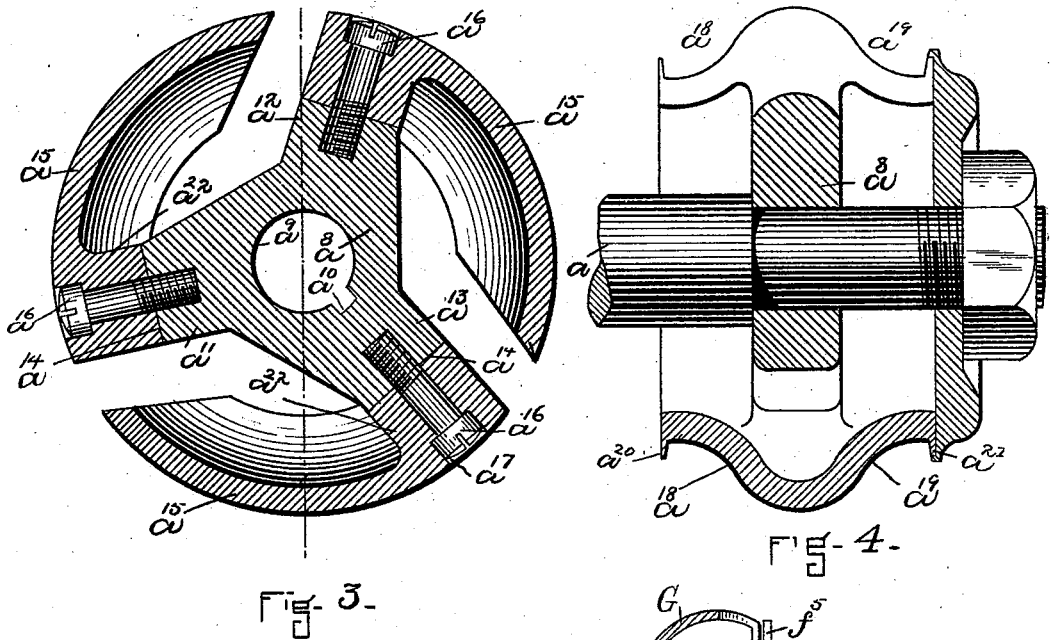
Fig-3-   Fig-4-
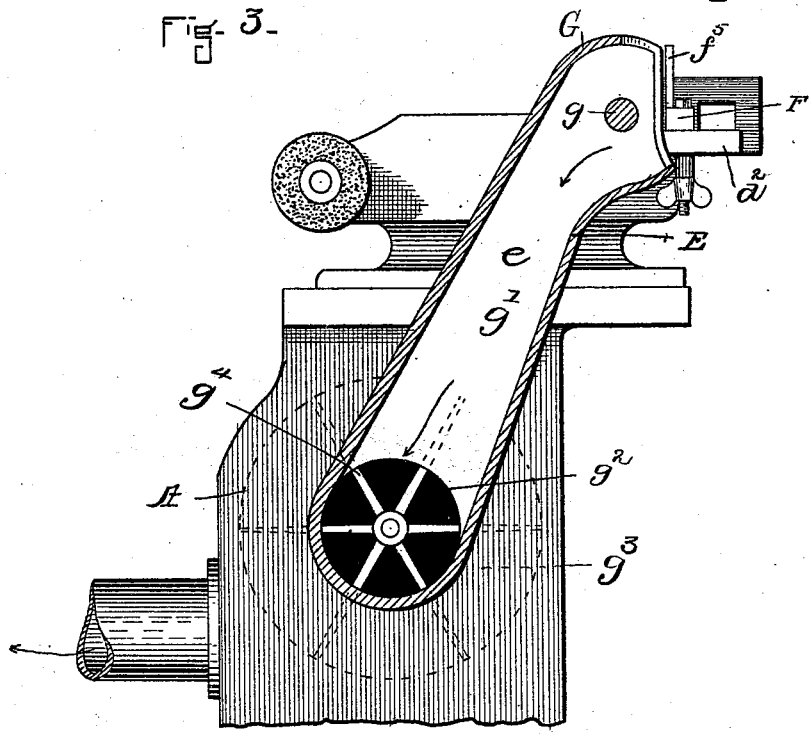
Fig-5-
WITNESSES
J. M. Dolan
A. P. Porter
INVENTOR
Charles H. Trask
by his attys
Clarke & Raymond (No Model.) 6 Sheets—Sheet 4.

C. H. TRASK.
HEEL TRIMMING MACHINE.

No. 521,770. Patented June 19, 1894.

WITNESSES,
J. M. Dolan.
A. P. Porter.

INVENTOR—
Charles H. Trask
by his attys
Clarke & Raymond (No Model.) 6 Sheets—Sheet 5.
C. H. TRASK.
HEEL TRIMMING MACHINE.

No. 521,770. Patented June 19, 1894.

WITNESSES.
J. M. Dolan.
A. P. Porter.

INVENTOR -
Charles H. Trask
by his attys
Charles K. Raymond (No Model.) 6 Sheets—Sheet 6.

C. H. TRASK.
HEEL TRIMMING MACHINE.

No. 521,770. Patented June 19, 1894.

WITNESSES.
J. M. Dolan
A. P. Porter

INVENTOR.
Charles H. Trask
by his attys
Clarke & Raymond

UNITED STATES PATENT OFFICE.

CHARLES H. TRASK, OF LYNN, MASSACHUSETTS.

HEEL-TRIMMING MACHINE.

SPECIFICATION forming part of Letters Patent No. 521,770, dated June 19, 1894.

Application filed December 17, 1889. Serial No. 334,057. (No model.)

*To all whom it may concern:*

Be it known that I, CHARLES H. TRASK, a citizen of the United States, residing at Lynn, in the county of Essex and State of Massachusetts, have invented a new and useful Improvement in Heel-Trimming Machines, of which the following is a full, clear, and exact description, reference being had to the accompanying drawings, forming a part of this specification, in explaining its nature.

The invention relates to machines for trimming the heels of boots and shoes employing a rotary cutter, and comprises various details of construction and organization, all of which will hereinafter be fully described.

Figure 1:
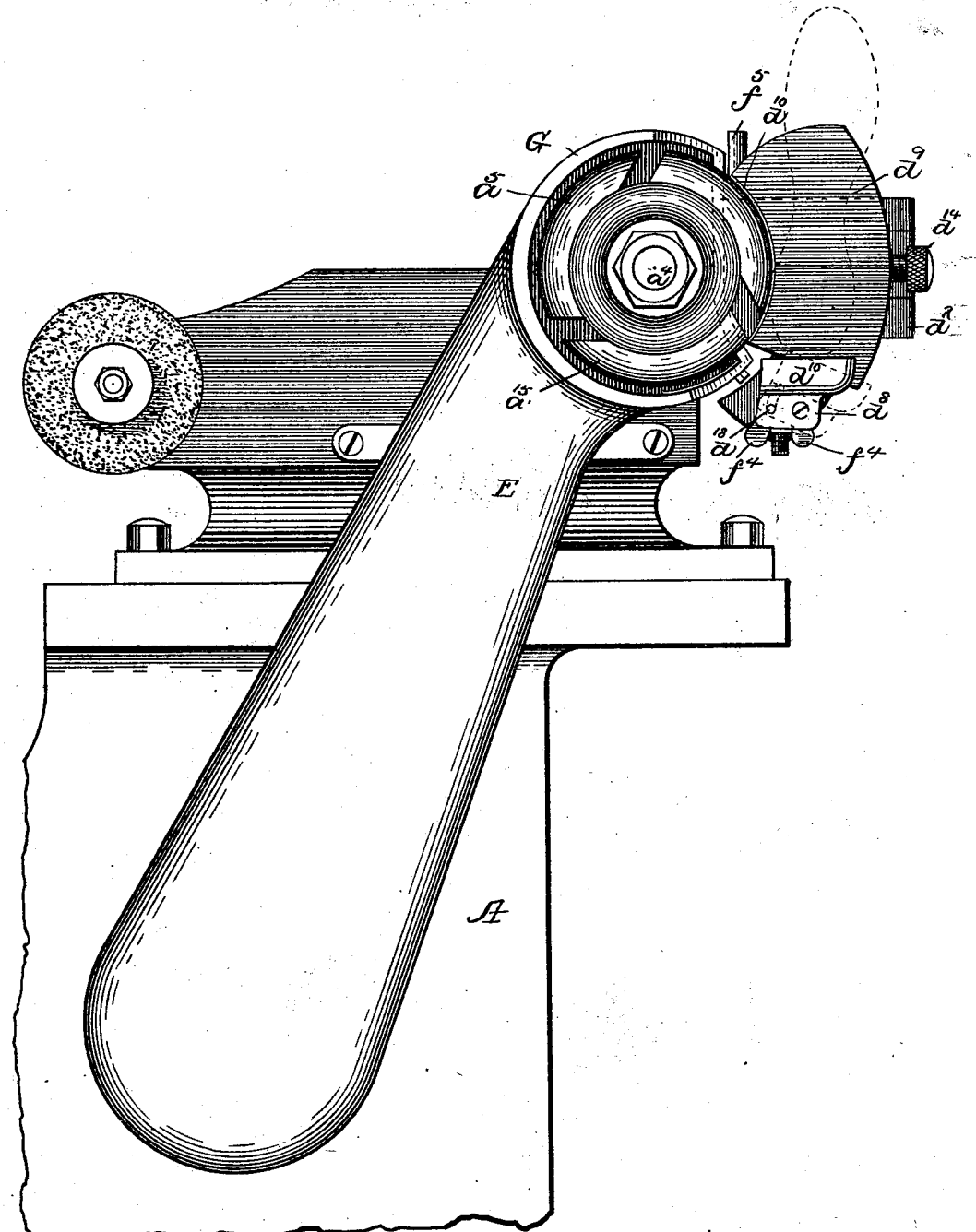
Figure 6:
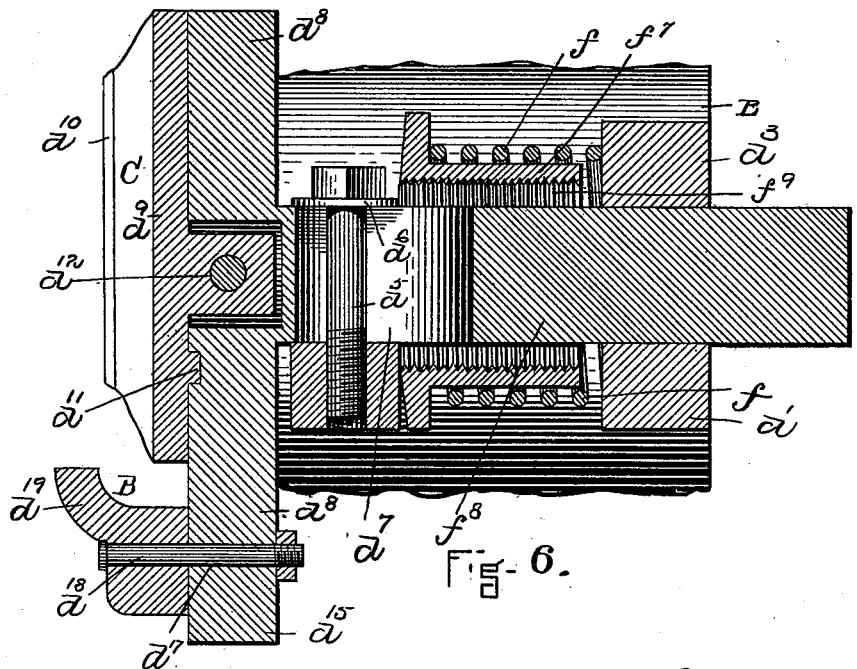
Figure 7:
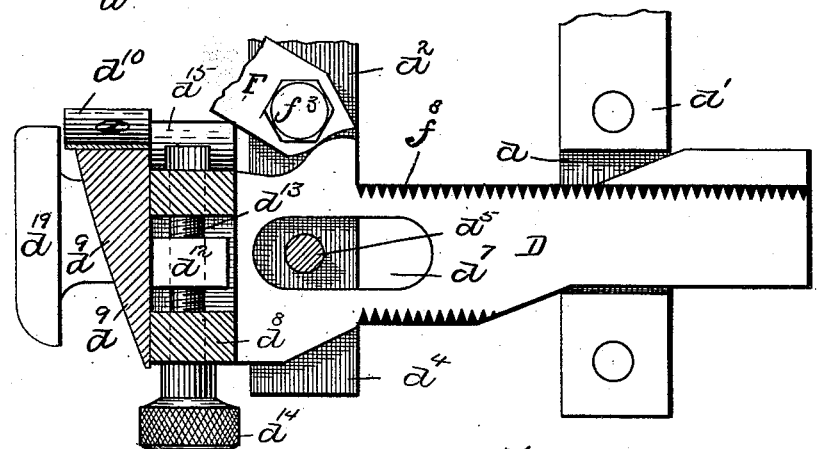
Figure 8:
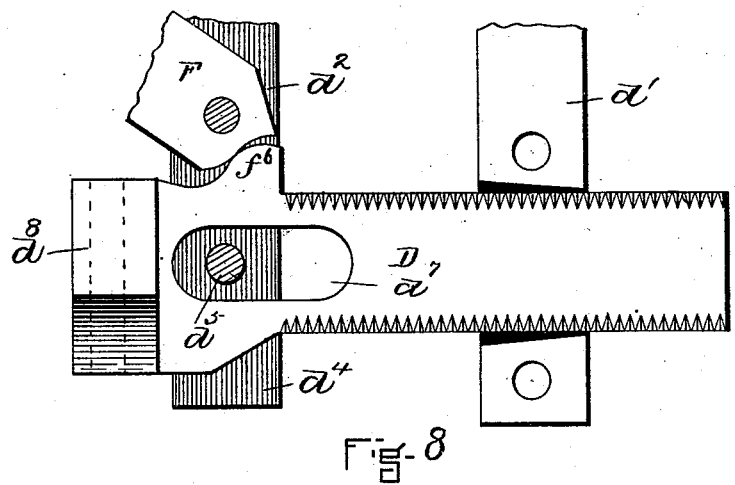
Figure 9:
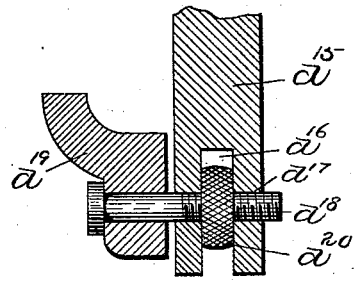
Figure 10:
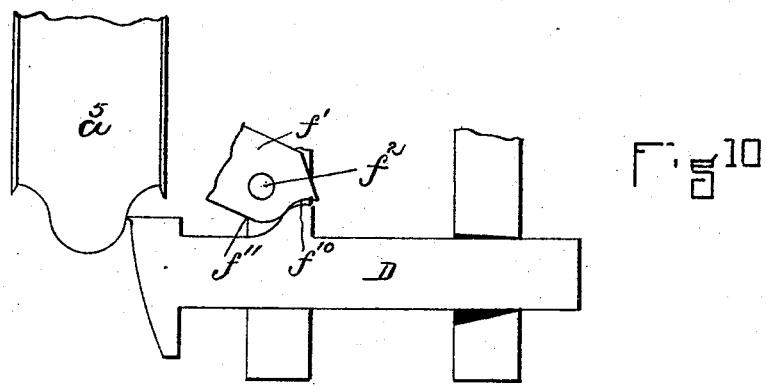
Figure 11:
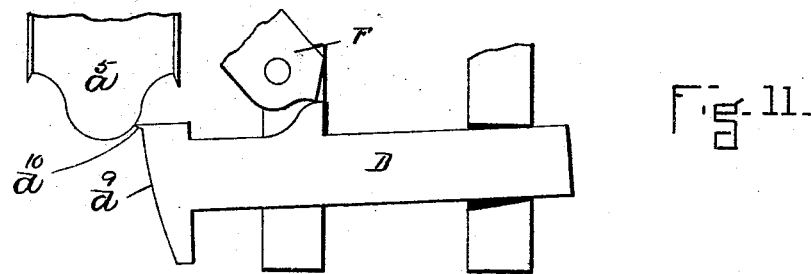
Figure 12:
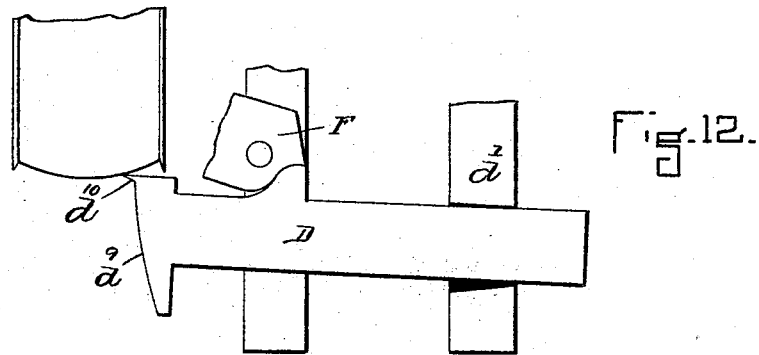

In the drawings,—Figure 1 is a view principally in front elevation of one side of the machine to illustrate parts of the invention. Fig. 2 is a view in plan of a portion of the machine. Fig. 3 is a view in vertical section taken crosswise the cutter. Fig. 4 is a view in section taken lengthwise the cutter. Fig. 5 is a detail view to illustrate the relation of the cutter to the exhaust passage. Fig. 6 is a detail view principally in vertical section to show the method of adjusting the heel rest in relation to the cutter to which reference is hereinafter made. Fig. 7 is a detail view to further illustrate said mechanism. Fig. 8 is a detail view to illustrate the relation of the guiding cam or pattern to the free or unrestrained end of the bar or support for the top lift and heel rests. Fig. 9 is a detail view to illustrate the manner of adjusting the heel seat rest. Figs. 10, 11, and 12 are diagrams to further illustrate the shape and application of the pattern or cam governing the relation of the top lift edge rest and its movement together with the movements of the tread rest and heel rest in relation to the rotary cutter, Figs. 10 and 11 representing cutters for trimming ogee heels, and Fig. 12 representing a cutter with a comparatively straight edge.

Referring to the drawings,—A represents the frame of the machine. Upon it is mounted the shaft $a$ which has the bearings in the boxes $a'$ $a^2$ (see Fig. 2) and is rotated by the pulley $a^3$. It supports or carries at its end $a^4$ the rotary cutter $a^5$, and at its other end $a^6$ the rotary cutter $a^7$. The cutters may be of any desired form or shape, but I prefer the form represented in Figs. 3 and 4, where $a^8$ represents the cutter holding hub having the hole $a^9$ for the reception of its operating shaft, the key way $a^{10}$, and three arms $a^{11}$ $a^{12}$ $a^{13}$, the arms being equidistant from each other, and each having a flat end $a^{14}$.

To each end of an arm is secured a cutter $a^{15}$ by means of a screw $a^{16}$, the head of which is held in a countersunk recess $a^{17}$ in the cutter. Each cutter is of peculiar shape in that it has the double cutting sections $a^{18}$ $a^{19}$ which are integral with each other and in continuity, and each of which has the rand cutters $a^{20}$ $a^{21}$ also formed integral with the cutter or blade. The cutter also has at its back edge near the center of its width a boss $a^{22}$ which bears against the flat end of its holding arm, and the blade of the cutter is of very considerable length (see Fig. 3), and it will be observed that there are but three blades used and that the cutter has quite a large diameter.

To obtain the proper rake of the cutters, or in other words, to provide a suitable back-off the flat surfaces $a^{14}$ and the surfaces of the bosses $a^{22}$ of the cutters which come in contact with them are shaped so that the cutting edge of each cutter is held slightly farther away from the center of the cutter head than any other portion of the blade. The cutters being thus held extend on each side of the holding hub and consequently are open upon each side thereof, providing a clearance and escape for the chips.

B is the side rest, C the tread rest, and $c$ the top lift edge rest, and $c'$ the rand guide. The rand guide is attached to the shaft. The edge rest, tread rest, and top lift edge rest are all carried or supported by a bar D (see Figs. 2, 6 and 7). This bar extends horizontally and is movable horizontally and its outer end is also movable toward and from the cutter. Its inner end may be shaped as represented in Fig. 7 to extend through a hole $d$ in the support $d'$, or it may be shaped as represented in Fig. 8. I prefer the last named form. The bar D is carried by the support $d'$, above named, and the support $d^2$. Both these supports are represented as integral with a casting E bolted to the frame of the machine, and having the dust and chips exhaust passage $e$. The bar D is secured to the rear of these supports by a housing or cap $d^3$ screwed to the arm, and it rests upon the upper surface $d^4$ of the front support, being secured thereon by a bolt $d^5$ and washer $d^6$, which bolt extends through a slot $d^7$ in the bar into the support, the office of the bolt, washer, and slot being simply to hold the bar upon the rest in a manner to permit it and the guides and gages it carries to be moved laterally or toward, from, and lengthwise the cutter head. The bar has at the front end an enlargement or block $d^8$ which preferably is integral with it, and which supports the top lift edge rest, the tread rest, and the heel rest. The tread rest is formed by the plate $d^9$ the operating surface of which is inclined from its front edge backward, the front edge of which is curved, and to this curved front edge is secured a thin piece of steel $d^{10}$ arranged to project slightly from the rest surface, and this forms the top lift edge rest.

The plate is attached to the supporting block of the bar by means of a tongue $d^{11}$ which enters a recess in the face of the block $d^8$, and it is provided with a horizontal adjustment by means of the nut $d^{12}$ attached to or integral with its under surface and extending into a hole in said block $d^8$, and an adjusting screw $d^{13}$, which is secured to the block to turn, and which has a thread which enters the nut. The end of the screw has a thumb or turning piece $d^{14}$ by which it is readily turned to adjust the top lift edge rest and the tread rest horizontally in relation to the edge of the cutter head. The block $d^8$ also has a downward extension $d^{15}$ in which is formed a recess $d^{16}$ and cross holes $d^{17}$, one of which extends across the recess. These holes receive steady pins $d^{18}$ attached to the block or piece $d^{19}$ the surface of which forms the heel rest. One of these pins, the one which passes across the recess $d^{16}$ is threaded and receives an adjusting nut $d^{20}$ held in said recess, the edge of which extends beyond the face of the block, and this affords means for the ready adjustment of the heel rest lengthwise the cutter and in relation to the tread rest and top lift edge rest. The bar with the rests is held in any desired position to which it may be set by the adjusting devices and a cam guide F, and from that position is movable backward or lengthwise the cutter head upon a line parallel with the surface of the cutter head and governed by the said cam, and in opposition to the spring $f$ which constantly acts to move the said parts to their original position. The cam governing the movement of these parts is represented in Figs. 2, 7, 8, 10, 11, and 12, and is formed upon the edge of a plate $f'$ having a hole $f^2$ through which a headed stud $f^3$ extends into and through the support $d^2$, the lower end of the stud being threaded to receive a locking nut $f^4$. By loosening the locking nut, the cam plate may be turned to present any desired operating or guiding surface to the bar. To facilitate its turning there is extended up from the inner section of the plate a rod or section $f^5$ by which it is easily turned upon the loosening of its holding nut. To engage the guiding cam there is arranged upon the bar an extension $f^6$ which bears against the cam and is held in contact therewith to a certain extent by the spring and also by the operator as he presents the work to the cutter head, there being always an inward pressure upon some of the guides or gages, so that the said extension always is maintained in contact with the guiding cam surface. The position of the top lift edge rest, tread rest, and heel rest lengthwise the cutter head is determined by means of the adjusting nut $f^7$ which screws upon the threaded section $f^8$ of the bar D, and which is provided with a long thread $f^9$, the said nut covering the bar and holding the coiled spring $f$. This adjusting nut is held in contact with the side of the support $d^2$ by the spring $f$, and thereby acts as a stop in limiting the outward movement of the bar and the rests it supports. From the above it will be seen that there are two kinds of adjustments employed, first, those which relate to the position of the top lift edge rest, tread rest and heel seat rest in relation to the block which supports them and in relation to each other, and which adjustments are made before the machine is set in operation, and second, the adjustments which are made to the bar or block supporting the rests, and which govern their longitudinal position as a whole in relation to the cutter head, and also the path of the movement which they describe in relation to the side of the cutter head during the trimming of the heel blank, and these adjustments are also obtained before the machine is started by means of the adjusting nut $f^7$, which varies the longitudinal position of the rests and the changing of the position of the cam or guiding surface to cause the rests, and particularly the top lift edge rest, to follow a line parallel with the edge of the cutter head and as closely thereto as it is possible to operate it. The cam has any desired shape or guiding surface, as in fact the two surfaces $f^{10}$ $f^{11}$ are used for this purpose and give considerable range or variation to the curvature of the path in which the rests are moved. As above stated the casting which supports the block and rests also contains the exhaust passage. It is provided with an outward extending curved shell G, which acts as a hood in part for the cutter head, and it is cut away upon one side and a portion of the top to expose the cutter head. The shaft upon which the cutter head is mounted extends through a hole $g$ formed in the casting, and when the cutter head is in position its cavity opens into the passage in the shell E, and it is entirely surrounded upon all sides excepting where the shell is cut away to expose it (see Figs. 1, 2, and 5). The casting and the parts which it supports are the same for both cutter heads, and each casting has a downward extending section $g'$ through which the exhaust passage extends to the outlet $g^2$ to a common exhaust chamber $g^3$ in which there is arranged an exhaust fan or fans $g^4$ so that the chips and dust from both cutters are drawn through the separate exhaust passages by a common exhausting device.

Having thus fully described my invention, I claim and desire to secure by Letters Patent of the United States—

1. In a heel trimming machine, in combination with a rotary cutter, a longitudinally movable bar or support located at one side of the axis of said cutter and having its forward end adjacent to said cutter and unrestricted or free to move in a direction toward and from the cutter, a top lift edge rest carried thereby, and a cam for governing the movement of the free end of the bar and of the top lift edge rest carried thereby toward the cutter, substantially as described.

2. In a heel trimming machine, in combination with a rotary cutter, a longitudinally movable bar or support located at one side of the axis of said cutter and having its forward end adjacent to said cutter and unrestricted or free to move in a direction toward and from the cutter, a tread rest carried thereby, and a cam for governing the movement of the free end of the bar and of the tread rest carried thereby toward the cutter, substantially as described.

3. In a heel trimming machine, in combination with a rotary cutter, a longitudinally movable bar or support located at one side of the axis of said cutter and having its forward end adjacent to said cutter and unrestricted or free to move in a direction toward and from the cutter, a heel rest carried thereby, and a cam for governing the movement of the free end of the bar and of the heel rest carried thereby toward the cutter, substantially as described.

4. In a heel trimming machine, in combination with a rotary cutter, a longitudinally movable bar or support located at one side of the axis of said cutter and having its forward end adjacent to said cutter and unrestricted or free to move in a direction toward and from the cutter, a top lift edge rest and tread rest carried thereby, and a cam for governing the movement of the free end of the bar and of the top lift edge rest and tread rest carried thereby toward the cutter, substantially as described.

5. In a heel trimming machine, in combination with a rotary cutter, a longitudinally movable bar or support located at one side of the axis of said cutter and having its forward end adjacent to said cutter and unrestricted or free to move in a direction toward and from the cutter, a top lift edge rest, tread rest and heel rest carried thereby, and a cam for governing the movement of the free end of the bar and of the top lift edge rest, tread rest, and heel rest carried thereby toward the cutter, substantially as described.

6. In a heel trimming machine, in combination with a rotary cutter, a longitudinally movable bar or support located at one side of the axis of said cutter and having its forward end adjacent to said cutter and unrestricted or free to move in a direction toward and from the cutter, a tread rest and heel rest carried thereby, and a cam for governing the movement of the free end of the bar and of the tread rest and heel rest carried thereby toward the cutter, substantially as described.

7. In a heel trimming machine, in combination with a rotary cutter, a longitudinally movable bar or support located at one side of the axis of said cutter and having its forward end adjacent to said cutter and unrestricted or free to move in a direction toward and from the cutter, a top lift edge rest and heel rest carried thereby, and a cam for governing the movement of the free end of the bar and of the top lift edge rest and heel rest carried thereby toward the cutter, substantially as described.

8. The combination in a heel trimming machine of the cutter head, a longitudinally movable bar or support located at one side of the axis of said cutter and having its forward end adjacent to said cutter and unrestricted or free to move in a direction toward and from the cutter, a cam for governing the path of the free end of the bar, and a top lift edge rest supported at the forward end of said bar to move crosswise the same, and an adjusting screw for moving the said rest upon the bar into desired position thereon, as and for the purposes described.

9. The combination in a heel trimming machine of the cutter head, a longitudinally movable bar or support located at one side of the axis of said cutter and having its forward end adjacent to said cutter and unrestricted or free to move in a direction toward and from the cutter, a cam for governing the path of the free end of the bar, and a tread rest supported at the forward end of said bar to move crosswise the same, and an adjusting screw for moving the said rest upon the bar into desired position thereon, as and for the purposes described.

10. In a heel trimming machine, the combination with the trimming cutter of a support having the recess $d^{16}$, of the heel rest B, mounted upon said support and having a threaded rod extending through said recess, and an adjusting nut held in said recess through which said threaded rod extends, as and for the purposes described.

11. The combination of the cutter head with the longitudinally movable bar, the front end of which is free or unrestricted, the top lift edge rest and tread rest supported thereby, the cam F, and the spring $f$, substantially as described.

12. The combination of the cutter head with the longitudinally movable bar, the front end of which is free or unrestricted, the top lift edge rest and tread rest supported thereby, the cam F, adjusting nut $f^7$, and spring $f$, substantially as described.

13. The combination of the cutter head with the longitudinally movable bar, the front end of which is free or unrestricted, the top lift edge rest and tread rest supported thereby, the cam F, the adjustable nut $f^7$, to act as a stop, the spring $f$ and a relatively fixed abutment against which the nut $f^7$ brings up, substantially as described.

14. The combination of the cutter head with the longitudinally movable bar, the front end of which is free or unrestricted, the top lift edge rest and tread rest supported thereby, the cam F, and the adjustable nut $f^7$, having a sleeve or barrel upon which the spring $f$, is mounted, substantially as described.

15. The combination of the cutter head, the longitudinally movable bar D, the front end of which is free or unrestricted as specified, the governing cam F, and the rear support $d'$ for said bar, and the front support or rest for said bar, the front end of said bar being held to said front support by means of a washer and bolt $d^{15}$, which bolt extends through a slot in the bar, substantially as described.

16. The combination in a trimming machine of the rotary cutter, the longitudinally movable bar D, the top lift edge rest and tread rest supported thereby, and the cam F, having a guiding surface and adjustable upon its support to present different sections of its guiding surface to the bar, as and for the purposes described.

17. The combination in a trimming machine of the rotary cutter, the longitudinally movable bar the front end of which is free or unrestricted, the top lift edge rest and heel rest carried thereby, the cam F, having the cam surfaces $f^{10} f^{11}$ mounted upon a rotary shaft, the stud $f^5$, whereby it is adapted to be turned, and locking devices for locking it in any desired position, substantially as described.

18. In a heel trimming machine the combination with the rotary cutter, of a supporting bar adjacent thereto, top lift edge and heel rests carried thereby, and a cam for governing the longitudinal path of the top lift edge rest and heel rest in relation to the cutter head comprising a plate having a guiding surface and adapted to be turned, substantially as described.

19. In a heel trimming machine the combination with the rotary cutter, of a supporting bar adjacent thereto, top lift edge and heel rests carried thereby, and a cam for governing the longitudinal path of the top lift edge rest and heel rest in relation to the cutter head comprising a plate having a stud or shaft extending through a hole in its support and threaded to receive a locking screw, substantially as described.

20. In a heel trimming machine the combination with the trimming mechanism, of a supporting bar adjacent thereto, top lift edge and heel rests carried by said bar, and a cam for governing the longitudinal path of the top lift edge rest and heel rest in relation to the cutter head comprising a plate having a locking device and also an outward extending arm whereby its position is easily adjusted, substantially as described.

21. The combination in a trimming machine of a shaft, a rotary cutter carried at each end of the shaft and heel governing or presenting devices in connection with each cutter head embracing a longitudinally movable bar the front end of which is free to be governed by a cam, a top lift edge rest, tread rest, and heel rest carried thereby, a spring for moving the said bar outwardly or toward the front of the cutter head, and a cam for governing the backward movement of the said rests, and with which the bar is held in contact, substantially as described.

22. The combination in a heel trimming machine of the casting E having a passage $e$ and the hood G, shaped as specified, and also having brackets or supports $d'$ $d^2$ for the longitudinally movable bar D, with the cutter head, the said longitudinally movable bar, the rests carried thereby and their governing cam, substantially as described.

23. The combination, in a heel trimming machine, of the rotary shaft, a cutter head carried at each end thereof, the two castings E, having exhaust passages $e$, extending to the common exhaust chamber, the exhaust fan or fans in said chamber, the sections of shells embracing or surrounding the cutters as specified and integral with said castings for carrying the longitudinally movable bars, said bars each of which carries at its front end a top-lift edge rest, tread rest, and heel rest, and a cam in connection with each bar for governing its longitudinal movement and that of the rests it carries, substantially as described.

24. The combination, in a heel trimming machine, of the rotary cutter, the longitudinally movable bar supporting at its front end the top lift edge rest and the tread rest, and having a projection $f^6$, to come in contact with the guiding surfaces of a governing cam, and said governing cam, substantially as described.

25. In a heel trimming machine, the combination with a rotary cutter, of a spring-pressed, longitudinally movable bar, supported at each end against vertical movement, adjacent to said cutter, one end of said bar having free horizontal movement, a top lift edge rest carried by said bar, and a cam for governing the movement of the said bar and top lift edge rest, substantially as described.

26. In a heel trimming machine, the combination with a rotary cutter, of a longitudinally movable bar supported at each end against vertical movement, adjacent to said cutter, a top lift edge rest carried at one end of said bar, which end has free horizontal movement, means for adjusting and controlling the longitudinal movement of the said bar and a cam for governing the horizontal movement of said free end, substantially as described.

27. In a heel trimming machine, the combination with a rotary cutter, of a longitudinally movable bar supported against vertical movement at each end, adjacent to said cutter, a tread rest carried at the front end of said bar, said front end and tread rest having free horizontal movement, means for controlling and adjusting the longitudinal movement of said bar, and a cam for governing the horizontal movement of the free end of said bar.

28. In a heel trimming machine, the combination with a rotary cutter, of a longitudinally movable threaded bar, supported against vertical movement, adjacent to said cutter, one end of said bar having free horizontal movement, suitable rests carried by said free end, a spring for moving said bar longitudinally, a nut on said threaded bar to control the tension of said spring and the longitudinal movement of said bar, and a cam for governing the horizontal movement of said free end, substantially as described.

CHARLES H. TRASK.

Witnesses:
F. F. RAYMOND, 2d,
J. M. DOLAN,
A. P. PORTER.